United States Patent
Lee

(10) Patent No.: US 12,424,016 B2
(45) Date of Patent: Sep. 23, 2025

(54) SYSTEM FOR IDENTIFYING COMPANION ANIMAL AND METHOD THEREFOR

(71) Applicant: Ajirang rangirang Inc., Seoul (KR)

(72) Inventor: Tae Gwon Lee, Seoul (KR)

(73) Assignee: Ajirang rangirang Inc., Seoul (KR)

( * ) Notice: Subject to any disclaimer, the term of this patent is extended or adjusted under 35 U.S.C. 154(b) by 189 days.

(21) Appl. No.: 18/274,280

(22) PCT Filed: Apr. 29, 2022

(86) PCT No.: PCT/KR2022/006157
§ 371 (c)(1),
(2) Date: Jul. 26, 2023

(87) PCT Pub. No.: WO2022/240029
PCT Pub. Date: Nov. 17, 2022

(65) Prior Publication Data
US 2024/0087352 A1 Mar. 14, 2024

(30) Foreign Application Priority Data
May 11, 2021 (KR) .................. 10-2021-0060774

(51) Int. Cl.
*G06V 40/10* (2022.01)
*G06V 10/25* (2022.01)
(Continued)

(52) U.S. Cl.
CPC .............. *G06V 40/10* (2022.01); *G06V 10/25* (2022.01); *G06V 10/44* (2022.01); *G06V 10/50* (2022.01);
(Continued)

(58) Field of Classification Search
CPC ........ G06V 40/10; G06V 10/25; G06V 10/44; G06V 10/50; G06V 10/774; G06V 10/82;
(Continued)

(56) References Cited

U.S. PATENT DOCUMENTS

| 6,845,382 | B2 * | 1/2005 | Meadows | A01K 11/006 |
| 11,650,622 | B2 * | 5/2023 | Choi | G06F 1/1605 |
| | | | | 345/156 |

(Continued)

FOREIGN PATENT DOCUMENTS

| KR | 10-2020-0041296 A | 4/2020 |
| KR | 10-2020-0042379 A | 4/2020 |

(Continued)

OTHER PUBLICATIONS

Notice of Allowance of Priority issued from Korean Patent Application No. 10-2021-0060774 issued on Oct. 28, 2021.
(Continued)

*Primary Examiner* — Wesley J Tucker
(74) *Attorney, Agent, or Firm* — Sughrue Mion, PLLC

(57) ABSTRACT

The present invention relates to a technology capable of identifying a companion animal by analyzing video, image, and voice data collected through CCTV or a camera, for management of companion animals and tracking in case of loss thereof, wherein, by simultaneously or sequentially using at least one identification method among facial recognition, nose print recognition, voice recognition, and motion recognition by analyzing a video, image, or voice, an effect of greatly improving the reliability of object identification for companion animals can be provided.

5 Claims, 8 Drawing Sheets

(51) Int. Cl.
*G06V 10/44* (2022.01)
*G06V 10/50* (2022.01)
*G06V 10/774* (2022.01)
*G06V 10/82* (2022.01)
*G06V 20/40* (2022.01)

(52) U.S. Cl.
CPC ............ *G06V 10/774* (2022.01); *G06V 10/82* (2022.01); *G06V 20/41* (2022.01); *G06V 20/49* (2022.01)

(58) Field of Classification Search
CPC ........ G06V 20/41; G06V 20/49; G06V 40/70; G06N 3/04; G06N 3/08; G10L 25/03; G10L 25/51
See application file for complete search history.

(56) References Cited

U.S. PATENT DOCUMENTS

| | | | | |
|---|---|---|---|---|
| 11,948,390 | B1* | 4/2024 | Wang | ...................... G06V 10/70 |
| 2014/0267301 | A1* | 9/2014 | Yang | ...................... G06F 18/231 |
| | | | | 345/467 |
| 2015/0078626 | A1* | 3/2015 | Kinard | ................... A01K 11/00 |
| | | | | 382/110 |
| 2016/0095292 | A1* | 4/2016 | Hosseini | ............ H04N 1/00209 |
| | | | | 348/161 |
| 2019/0080160 | A1* | 3/2019 | Wee | ......................... G06F 18/22 |
| 2021/0068371 | A1* | 3/2021 | Chen | ..................... A01K 11/006 |
| 2024/0048842 | A1* | 2/2024 | Zhu | .......................... G06T 7/50 |
| 2024/0075631 | A1* | 3/2024 | Wu | .......................... B25J 9/163 |
| 2024/0087368 | A1* | 3/2024 | Lee | ........................ G06V 10/761 |
| 2024/0214670 | A1* | 6/2024 | Pak | .......................... H04N 23/64 |
| 2025/0190531 | A1* | 6/2025 | Lim | ........................ G06Q 50/22 |

FOREIGN PATENT DOCUMENTS

| | | |
|---|---|---|
| KR | 10-2020-0123161 A | 10/2020 |
| KR | 10-2020-0136206 A | 12/2020 |
| KR | 10-2020-0143000 A | 12/2020 |
| KR | 10-2325250 B1 | 11/2021 |

OTHER PUBLICATIONS

International Search Report for PCT/KR2022/006157 dated Aug. 8, 2022 (PCT/ISA/210).

* cited by examiner

[FIG. 1]
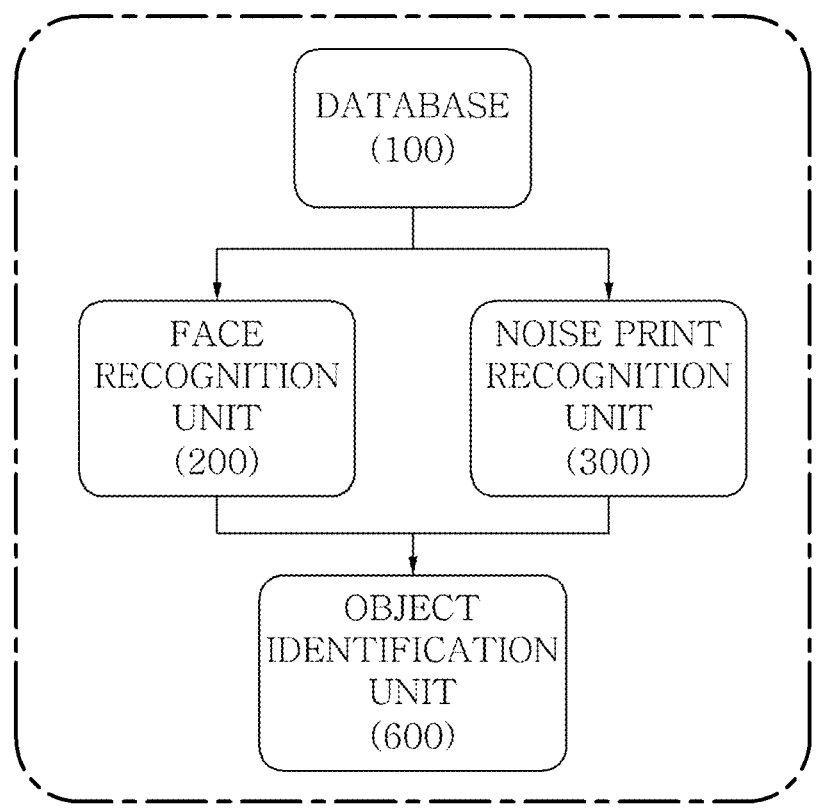

[FIG. 2]
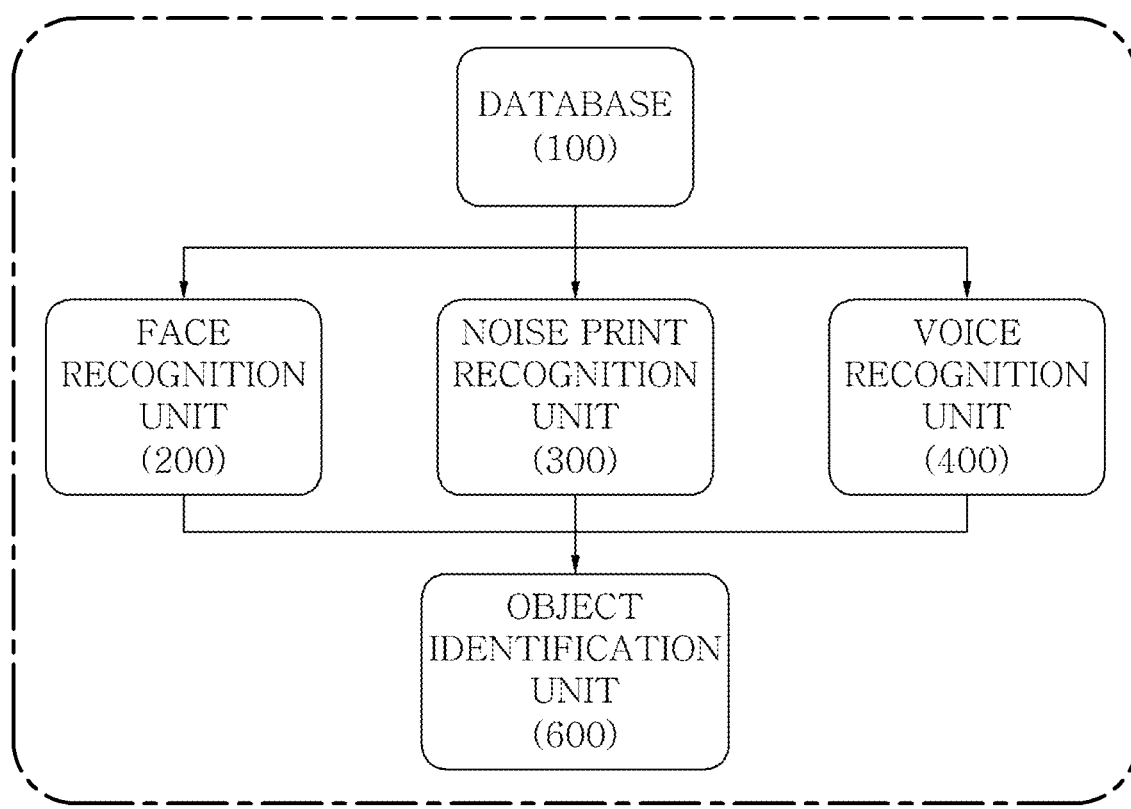

[FIG. 3]
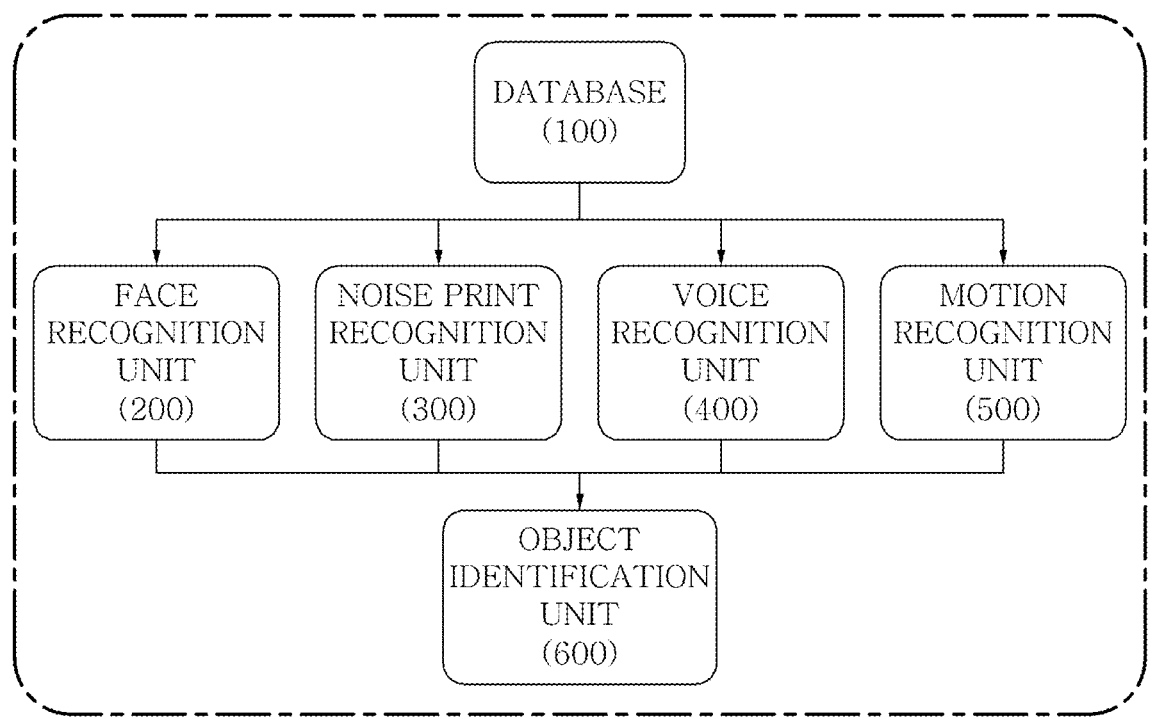

[FIG. 4]
[FIG. 5]
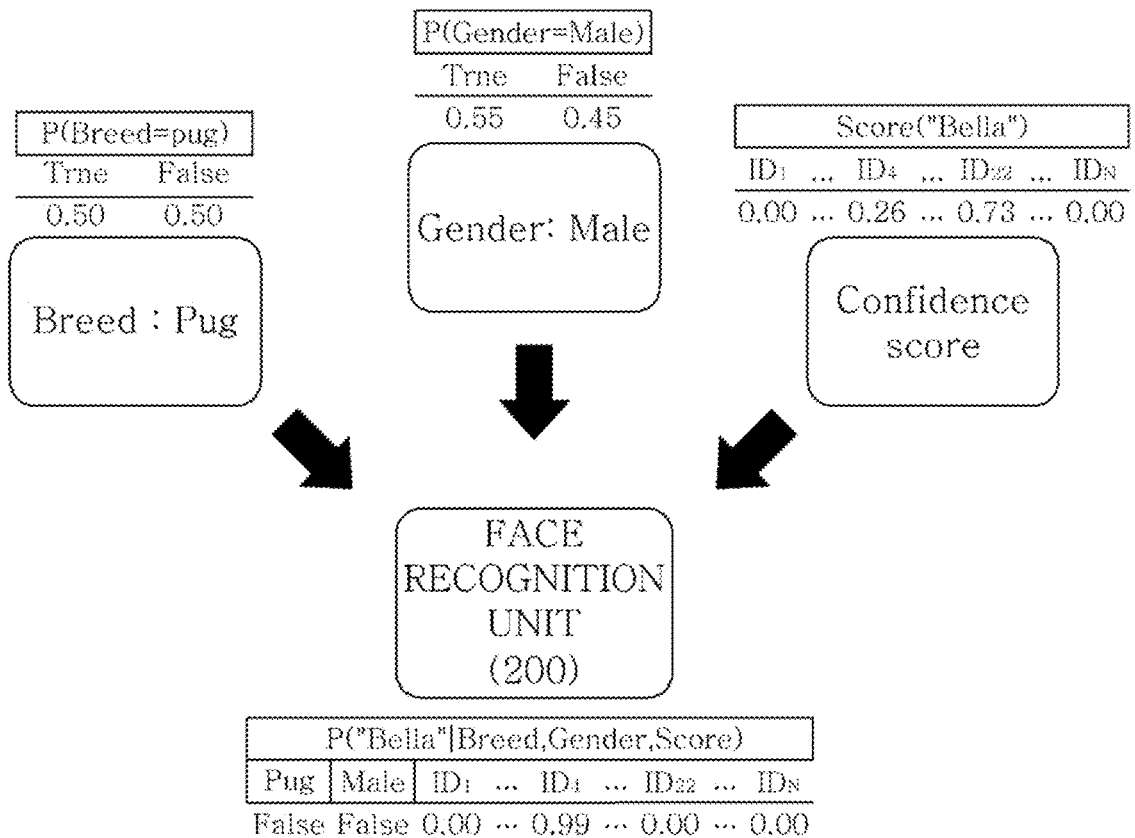

[FIG. 6]
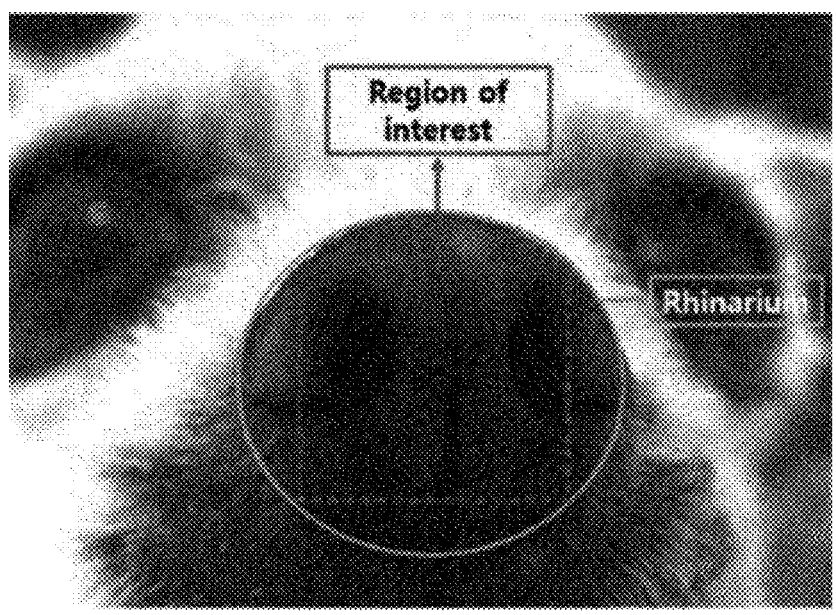

[FIG. 7]
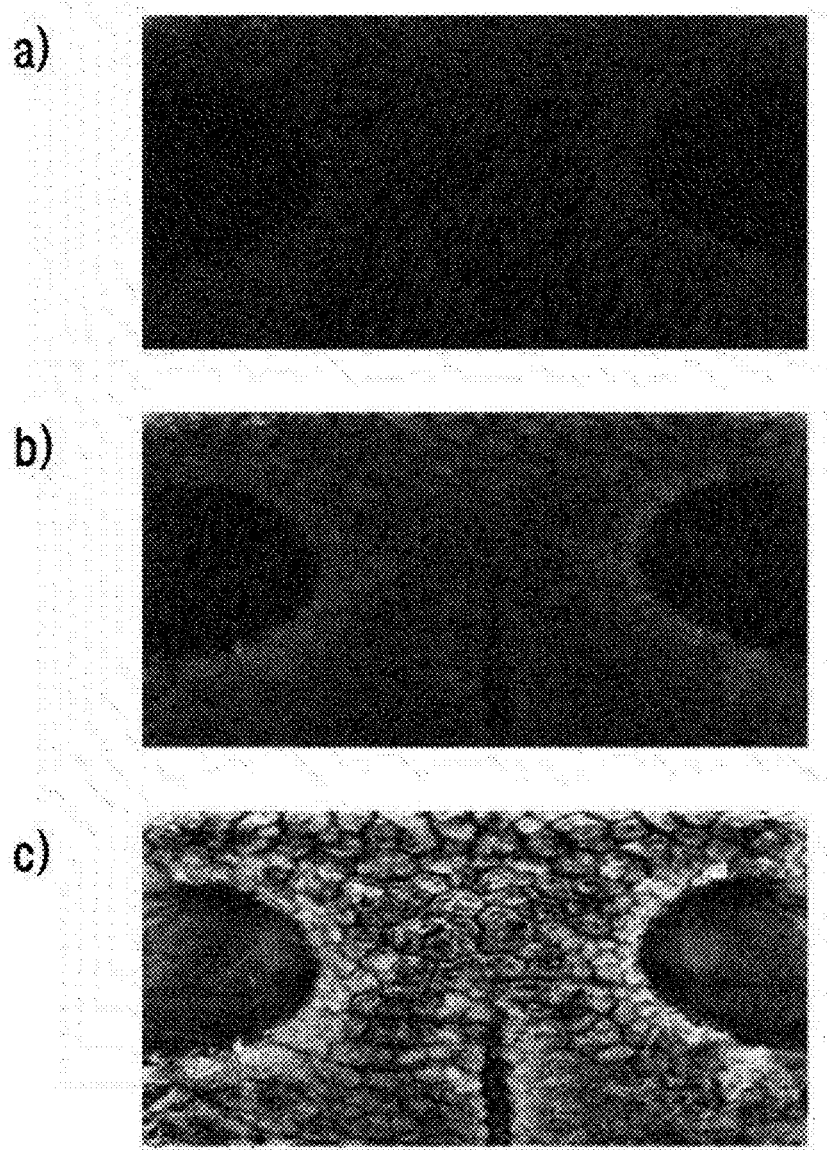

[FIG. 8]
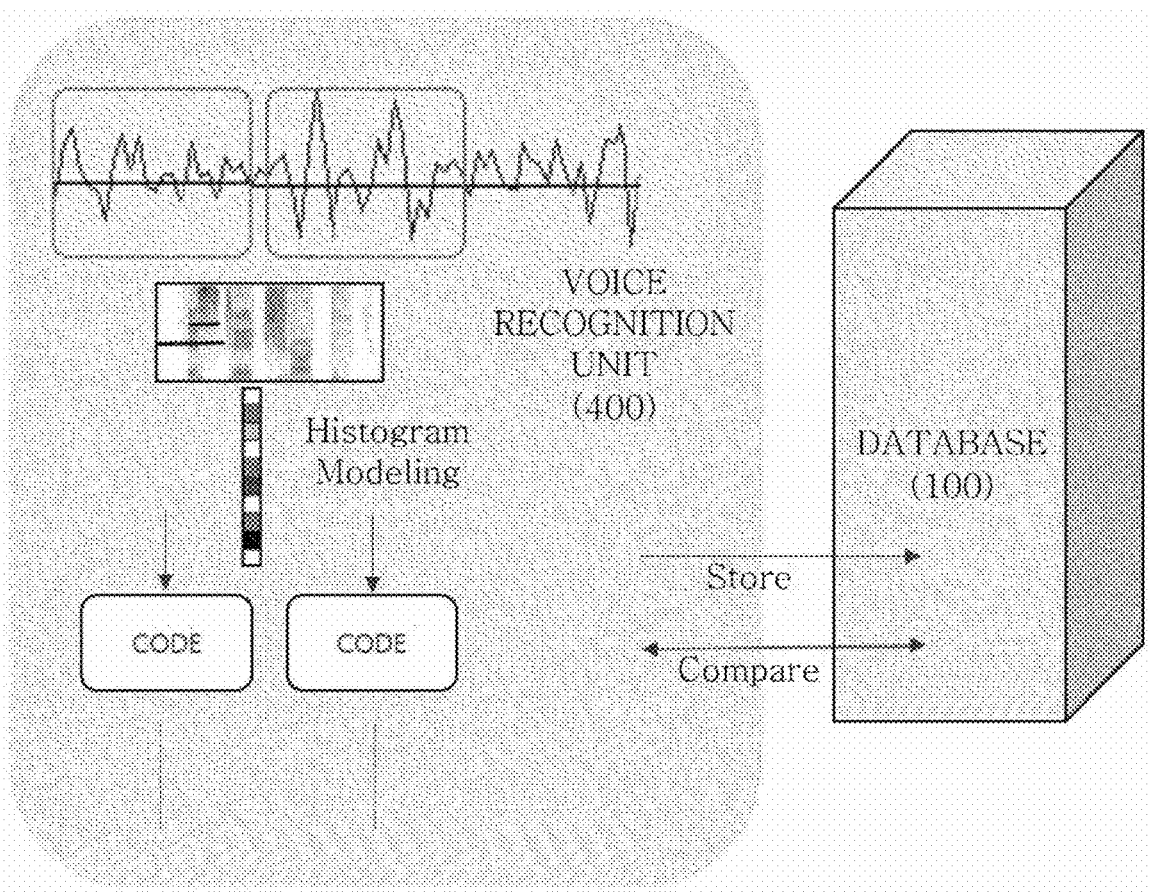
[FIG. 9]
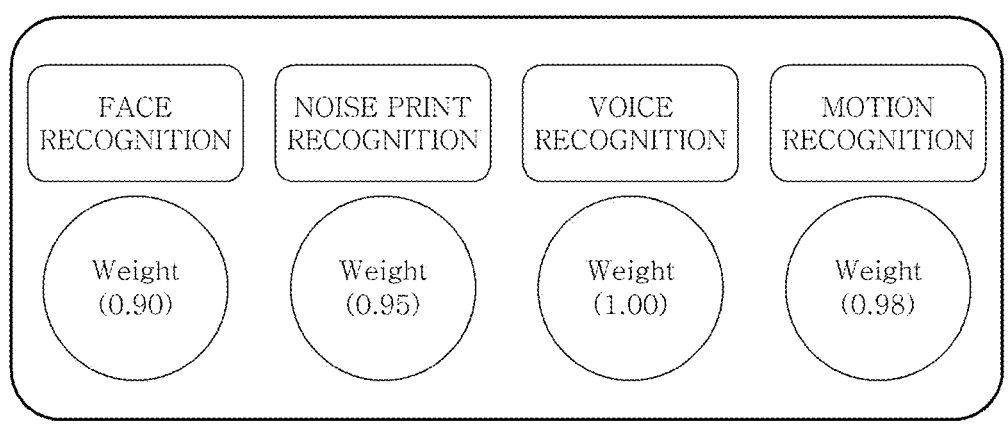

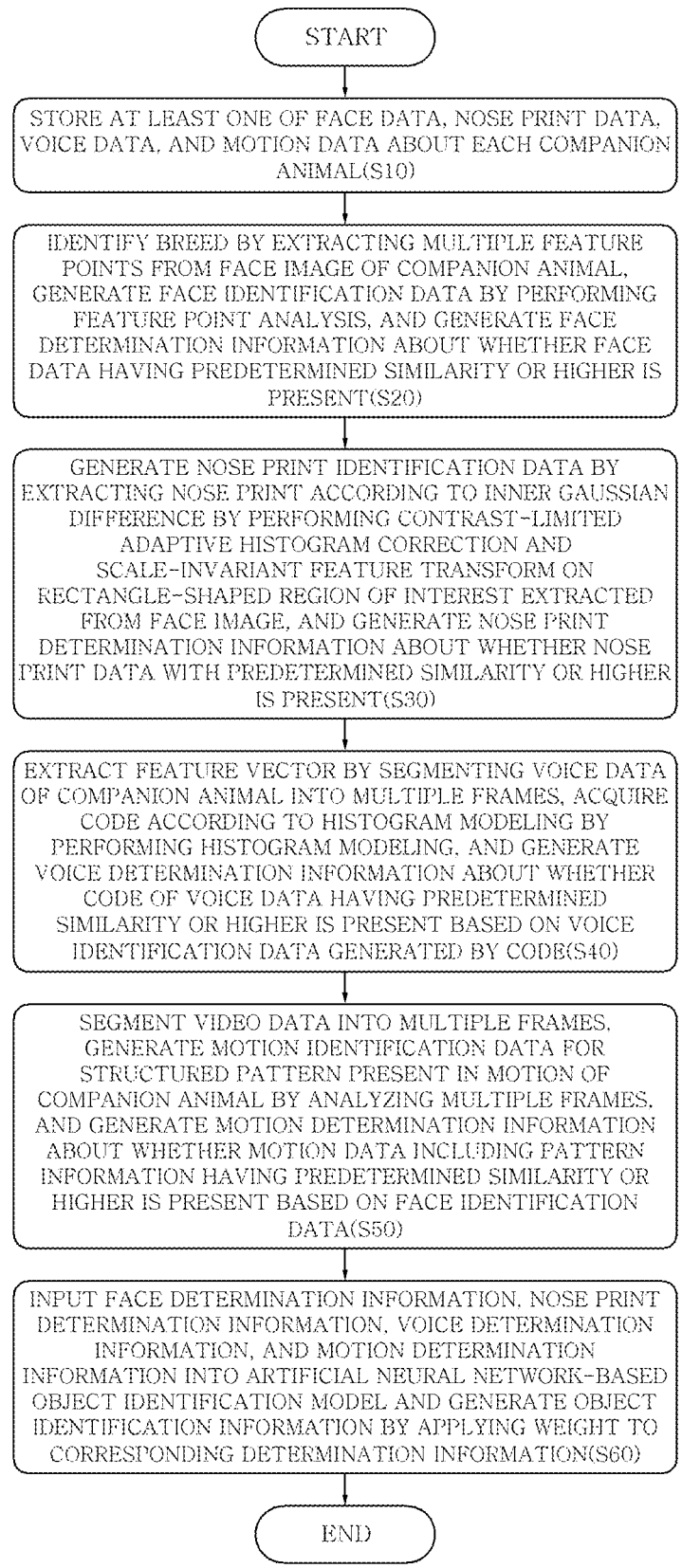

SYSTEM FOR IDENTIFYING COMPANION ANIMAL AND METHOD THEREFOR

CROSS REFERENCE TO RELATED APPLICATIONS

This application is a National Stage of International Application No. PCT/KR2022/006157 filed Apr. 29, 2022, claiming priority based on Korean Patent Application No. 10-2021-0060774 filed May 11, 2021, the entire disclosures of which are incorporated herein by reference.

TECHNICAL FIELD

The present disclosure relates to a technique for identifying a companion animal by analyzing video or image and voice data collected through a CCTV or camera or the like for management of the companion animal and tracking in case of loss thereof, and more particularly, to a companion animal identification system that can identify an animal object by performing at least one of face recognition, nose print recognition, voice recognition, and motion recognition to increase the identification reliability of the companion animal, and that has a companion animal identification function with high accuracy by generating object identification information by applying a weight to each determination information acquired by performing face recognition, nose print recognition, voice recognition, and motion recognition, and a method therefor.

BACKGROUND ART

Recently, the demand for companion animals has exploded due to the effects of increasing nuclear families and leisure activities, and the number of companion animals is also increasing due to the growing interest in companion animals.

However, with the increase in the number of companion animals, there are frequent cases of companion animals being lost, and it is very difficult to find lost companion animals. Thus, there is a need for an animal registration system for systematic management of companion animals.

The animal registration system is a law that requires companion animal owners to register their companion animals with the city, county, or district office in order to minimize stray animals, and can be divided into two types: an internal type that inserts a wireless identification chip into the companion animal's body and an external type that hangs an identification tag with a wireless identification chip around the companion animal's neck.

However, the internal type is relatively less safe than the external type because it requires a procedure to implant a wireless identification chip into the companion animal's body. Further, the external type is relatively less convenient than the internal type because the identification tag must be managed so as not to be lost.

Therefore, as an alternative technology to the animal registration system, a technology that utilizes images of animal objects has been attracting attention. However, reflected light can be included in the object image due to the angle of the camera and light for photographing the object, and incorrect information can be extracted from the object image due to the reflected light included in the object image, causing the accuracy of object recognition to decrease.

Therefore, there is a growing need to improve the accuracy of object authentication by solving the above-mentioned problems in performing object authentication through images taken of animal objects.

Korean Patent Application No. 10-2019-0070707 discloses "METHOD AND DEVICE FOR AUTHENTICATING ANIMAL OBJECT USING FEATURE INFORMATION." This document discloses a technique for detecting a face area from image information, detecting feature areas for eyes, nose, ears, face lines, etc. from the face area, detecting feature information related to iris, nose print, and face from the feature areas, and performing authentication of an animal object based on an object authentication value calculated by applying respective weights to the feature information.

However, there is a disadvantage that the above-described configuration alone lacks accuracy compared to face recognition technology that is basically trained on human faces, and nose print recognition is difficult to commercialize because high reliability cannot be ensured using only the general method disclosed in the above document.

DISCLOSURE

Technical Problem

The present disclosure may provide a technique for identifying an animal object by performing at least one of face recognition, nose print recognition, voice recognition, and motion recognition to improve identification reliability of a companion animal, and in particular, in face recognition, performing normalization based on a plurality of training data including information about eight feature points extracted from a captured face image, and training to identify a breed and gender, such as a breed of dog or a breed of cat, based on the training data and a dataset generated by applying weights to the normalized training data to improve identification accuracy.

In addition, for nose print recognition, by extracting a rectangular region of interest that includes the boundaries of the two nostrils of the companion animal, and performing contrast-limited adaptive histogram equalization and scale-invariant feature transform of on the region of interest to extract the nose print according to the inner Gaussian difference, a relatively high accuracy may be exhibited compared to recognizing the nose print through general feature point extraction and feature point contrast.

In addition, voice recognition may be performed by acquiring a code based on histogram modeling by analyzing voice data of a companion animal, and motion recognition may be performed by acquiring motion identification data for a structured pattern present in the movement of a companion animal by analyzing video data of the movement of the companion animal.

Technical Solution

According to embodiments of the present disclosure, a system for identifying a companion animal may include a database storing at least one of face data, noise print data, voice data, or motion data for each of a plurality of registered companion animals; a face recognition unit configured to capture a face image by searching for a face of the companion animal in acquired image information, to extract a plurality of feature points from the captured face image to generate face identification data enabling face identification in consideration of a breed or gender using an artificial neural network-based face identification model, and to generate face determination information about whether face data having a predetermined similarity or higher exists among the face data stored in the database based on the face identification data; a noise print recognition unit configured to extract a rectangle-shaped region of interest included in a circle having a diameter of 10 to 15 cm that includes boundaries of two nostrils of the companion animal from the face image, and to perform contrast-limited adaptive histogram equalization and scale-invariant feature transform on the region of interest to extract feature points according to an inner Gaussian difference to generate noise print identification data, and to generate noise print determination information about whether noise print data having a predetermined similarity or higher is present among the noise print data stored in the database based on the noise print identification data; and an object identification unit configured to generate object identification information by inputting the generated face determination information and the noise print determination information into the artificial neural network-based object identification model and applying a weight to each of the determination informations.

According to one embodiment of the present disclosure, the system may further include a voice recognition unit configured to segment the acquired voice data of the companion animal into a plurality of frames according to a preset reference value, extract a feature vector for the segmented frames to perform histogram modeling to acquire a code according to the histogram modeling, and generate voice determination information about whether a code of voice data having a predetermined similarity or higher is present among the codes of the voice data stored in the database based on the generated voice identification data including the code according to the histogram modeling; and an object identification unit configured to generate object identification information by inputting the generated face determination information, noise print determination information, and voice determination information into an artificial neural network-based object identification model and applying a weight to each of the determination informations.

According to one embodiment of the present disclosure, the system may further include a motion recognition unit configured to segment acquired video data into a plurality of consecutive frames according to a preset reference, analyze the plurality of frames to generate motion identification data for a structured pattern present in a motion of the companion animal, and generate motion determination information about whether motion data including pattern information having a predetermined similarity or higher is present among the motion data stored in the database based on the face identification data; and an object identification unit configured to generate object identification information by inputting the generated face determination information, noise print determination information, and motion determination information into an artificial neural network-based object identification model and applying a weight to each of the determination informations.

According to one embodiment of the present disclosure, the face recognition unit may be configured to: extract eight feature points from the captured face image, wherein the eight extracted points comprise a center point of a left eyeball, a center point of a right eyeball, a nose, an end point of a left ear, an end point of a right ear, a right contact point of the left ear and a forehead, a left contact point of the right ear and the forehead, and a top center end point of the forehead; perform normalization based on a plurality of training data from which the eight feature points are extracted, and an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest to increase identification accuracy; and calculate an optimal weight for the training data and the normalized training data based on an average accuracy and a corrected accuracy obtained based on the number of images determined as correct and the number of images determined as incorrect as a result of identifying the breed and gender through the artificial neural network-based face identification model.

According to one embodiment of the present disclosure, the face recognition unit may be configured to: perform convolutional operations with a plurality of convolutional operation layers by forming the artificial neural network-based face identification model as a convolutional neural network (CNN); divide a portion of the plurality of convolutional operation layers from the remaining portion of the plurality of convolutional operation layers to form a first layer group and a second layer group; input information about the eight feature points extracted from the image of the region of interest into an input layer of the first layer group, and derive breed identification information and gender identification information for the identified breed and gender by performing convolutional operations using a plurality of convolutional layers; and generate object identification information by inputting an output value of the first layer group and information about the extracted feature points into an input layer of the second layer group, calculate a confidence score for the object identification information based on the object identification information, and calculate a predictability of the face identification data based on the confidence score of the object identification information, the breed identification information, and the gender identification information.

Advantageous Effects

Using the companion animal identification system implemented according to the embodiments of the present disclosure, video, images, and audio collected by devices such as cameras, microphones, and CCTV can be analyzed, and at least one identification method among face recognition, nose print recognition, voice recognition, and motion recognition can be used simultaneously or sequentially. Accordingly, the reliability of individual identification of a companion animal can be greatly improved. In particular, by using an identification method that reflects identification information about the breed and gender of the companion animal to increase the recognition rate of face recognition performed on the animal, a face recognition function with much higher accuracy than the conventional technology may be provided.

In addition, in nose print recognition, more reliable nose print recognition may be performed by performing contrast-limited adaptive histogram equalization and scale-invariant feature transform on a rectangular region of interest that includes the boundaries of a companion animal's two nostrils. In speech recognition, the reliability of speech recognition may be improved by extracting feature vectors and performing histogram modeling. Also, in motion recognition, motion identification data for structured patterns may be used to compensate for weaknesses in face recognition, nose print recognition, and speech recognition.

DESCRIPTION OF DRAWINGS

FIG. 1 is a detailed block diagram of a companion animal identification system implemented according to a first embodiment of the present disclosure.

FIG. 2 is a detailed block diagram of a companion animal identification system implemented according to a second embodiment of the present disclosure.

FIG. 3 is a detailed block diagram of a companion animal identification system implemented according to a third embodiment of the present disclosure.

FIG. 4 illustrates eight feature points extracted for face recognition of a companion animal according to one embodiment of the present disclosure.

FIG. 5 is a diagram illustrating a process for calculating the predictability of face identification data using a confidence score of object identification information, breed identification information, and gender identification information according to one embodiment of the present disclosure.

FIG. 6 illustrates a process for extracting a region of interest from a nose image according to one embodiment of the present disclosure.

FIG. 7 shows a contrast between an original image and images that have undergone contrast-limited adaptive histogram equalization of a region of interest according to one embodiment of the present disclosure.

FIG. 8 illustrates extracting a feature vector from a frame of segmented speech data and performing histogram modeling to acquire a code according to one embodiment of the present disclosure.

FIG. 9 is a diagram illustrating generating object identification information by applying a weight to determination information according to one embodiment of the present disclosure.

FIG. 10 is a flowchart illustrating a companion animal identification method according to one embodiment of the present disclosure.

BEST MODE

Hereinafter, at least one embodiment of the present disclosure will be described in detail with reference to the accompanying drawings so that those skilled in the art can easily practice the present disclosure. The present disclosure may, however, be embodied in many different forms and should not be construed as limited to the embodiments set forth herein.

The terminology employed in this specification is merely used to describe specific embodiments and is not intended to limit the present disclosure. A singular expression includes a plural expression unless the context clearly dictates otherwise.

In this specification, the term "include" or "have" is intended to indicate that characteristics, figures, steps, operations, constituents, and components disclosed in the specification or combinations thereof exist. The term "include" or "have" should be understood as not pre-excluding possibility of existence or addition of one or more other characteristics, figures, steps, operations, constituents, components, or combinations thereof.

Unless defined otherwise, all terms used herein, including technical or scientific terms, have the same meaning as commonly understood by one of ordinary skill in the art to which this present disclosure belongs.

Terms such as those defined in commonly used dictionaries should be interpreted as having a meaning that is consistent with their meaning in the context of this specification and the relevant art and will not be interpreted in an idealized or overly formal sense unless expressly so defined herein.

It will be appreciated that each block of the processing flowchart illustrations and combinations of the flowchart illustrations may be performed by computer program instructions. These computer program instructions may be mounted on a processor of a general purpose computer, a special purpose computer, or other programmable data processing equipment, such that the instructions, when executed by the processor of the computer or other programmable data processing equipment, create means for performing the functions described in the flowchart block(s).

These computer program instructions may be stored in a computer-available or computer-readable memory that may be directed to a computer or other programmable data processing equipment to implement the functions in a particular manner, such that the instructions stored in the computer-available or computer-readable memory may produce an article of manufacture including instruction means for performing the functions described in the flowchart block(s).

The computer program instructions may also be loaded onto a computer or other programmable data processing equipment to perform a sequence of operational steps on the computer or other programmable data processing equipment to create a computer-executable process, such that the instructions for performing the computer or other programmable data processing equipment provide steps for performing the functions described in the flowchart block(s).

Further, each block may represent a module, segment, or portion of code including one or more executable instructions for performing a specified logical function(s).

It should also be noted that in some alternative implementations, the functions noted in the blocks may occur out of sequence. For example, two blocks shown one after the other may in fact be performed substantially simultaneously, or the blocks may sometimes be performed in reverse order according to the functions they perform.

As used herein, the term "unit" refers to software or a hardware component, such as a field-programmable gate array (FPGA) or an application-specific integrated circuit (ASIC), wherein the "unit" performs some functions.

However, the "unit" is not limited to software or hardware. The "unit" may be configured to be present on an addressable storage medium and may be configured to execute one or more processors.

Thus, in one example, the "unit" includes components such as software components, object-oriented software components, class components, and task components, processes, functions, attributes, procedures, subroutines, segments of program code, drivers, firmware, microcode, circuits, data, databases, data structures, tables, arrays, and variables. The functions provided in the components and units may be combined into a smaller number of components and units or further separated into additional components and units. In addition, the components and units may be implemented to execute one or more CPUs in the device or secure multimedia card.

In describing the embodiments of the present disclosure in detail, reference will be made to examples of specific systems, but the main points claimed herein are applicable to other communication systems and services having a similar technical background without departing substantially from the scope disclosed herein, as will be apparent to those skilled in the art.

Hereinafter, a companion animal identification system and a method therefor according to an embodiment of the present disclosure will be described with reference to the drawings.

FIG. 1 is a detailed block diagram of a companion animal identification system 10 implemented according to a first embodiment of the present disclosure.

The companion animal identification system 10 implemented according to the first embodiment of the present disclosure may include a database 100, a face recognition unit 200, a noise print recognition unit 300, and an object identification unit 600.

The database 100 may store at least one of face data, noise print data, voice data, and motion data about each of multiple registered companion animals.

According to one embodiment of the present disclosure, the database 100 may be implemented in the form of a repository or server included in the companion animal identification system 10 and may store at least one of face data including face identification information, noise print data including noise print identification information, voice data including voice identification information, and motion data including motion identification information for each individual companion animal that has undergone the registration procedure.

According to one embodiment of the present disclosure, the face identification data, the noise print identification data, the voice identification data, and the motion identification data generated by the face recognition unit 200, the noise print recognition unit 300, the voice recognition unit 400, and the motion recognition unit 500 may be compared with the face data, the noise print data, the voice data, and the motion data stored in the database 100, and data to search for data having a similarity or higher. Thereby, face determination data, nose print determination data, voice determination data, and motion determination data may be generated.

Here, the motion identification data and face data, noise print data, voice data, and motion data stored in the database 100 may refer to data including face, noise print, voice, and motion identification information about each individual of the companion animals.

The face recognition unit 200 may capture a face image by searching for a face of an companion animal in acquired image information, extract multiple feature points from the captured face image to generate face identification data enabling face identification in consideration of a breed or gender using an artificial neural network-based face identification model, and generate face determination information about whether face data having a predetermined similarity or higher is present among the face data stored in the database based on the face identification data.

According to one embodiment of the present disclosure, as a preprocessing step for extracting feature points and performing feature point analysis using an artificial neural network-based face identification model, a face image may be generated by first searching for the face of a companion animal and capturing the found image identified as a face.

According to one embodiment of the present disclosure, multiple feature points may be extracted from the captured face image. In order to minimize the consumption of computing resources and reduce the extraction time in extracting the features, the number of features to be extracted may be limited to a small number.

According to one embodiment of the present disclosure, when the number of features to be extracted is limited to a small number, the recognition accuracy must be maintained at or above a certain level while extracting a small number of features. Therefore, it is necessary to select features at advantageous positions to identify the face shape of the animal. Depending on the positions of the features, the amount of computing resources required to recognize the face, the recognition speed, and the recognition accuracy may vary greatly.

According to one embodiment of the present disclosure, a multi-object recognition technique may be used to extract the feature points. Among such techniques, the Oriented FAST and Rotated BRIEF (ORB) algorithm may be employed.

According to the above embodiment, a window region may be taken and the brightness value of the center point may be compared with 16 brightness values. For example, the brightness values located at 1, 5, 9, and 13 may first be compared and assigned a value of 1 when dark or bright and 0 when similar, and points with a value greater than 3 may be selected as candidate feature points.

Then, the remaining brightness values are compared to determine a point as a feature point when the value is greater than or equal to 12, and a pixel with the greatest value among 8 neighbor pixels around each feature point is determined as the final feature point. To remove blob feature points from the feature points and extract corner feature points, Haris Corner Detection can be utilized.

In this case, since Haris Corner Detection can recognize the corner area, only the corner can be extracted, and furthermore, the direction can be determined using the Intensity Centroid to obtain the main direction.

According to the above embodiment, creating a partial image around each feature point, rotating all comparison points using the main direction, and constructing a bit string description is less informative and differentiating.

To address this issue, p(x) and p(y) are not arbitrarily determined, but two pixel selection patterns with good informativeness and discrimination may be determined and made into training data, and 256 binary tests may be obtained based on the training data to generate descriptors.

According to one embodiment of the present disclosure, the face recognition unit 200 extracts eight feature points from the captured face image. The eight extracted points may include a center point of a left eyeball, a center point of a right eyeball, a nose, an end point of a left ear, an end point of a right ear, a right contact point of the left ear and a forehead, a left contact point of the right ear and the forehead, and a top center end point of the forehead.

According to the above embodiment, the identification accuracy may be increased by performing normalization based on multiple training data from which the eight feature points are extracted, and training an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest.

According to one embodiment of the present disclosure, as a result of identifying the breed and gender through the artificial neural network-based face identification model, an optimal weight for the training data and the normalized training data may be calculated based on an average accuracy and a corrected accuracy obtained based on the number of images determined as correct and the number of images determined as incorrect.

According to one embodiment of the present disclosure, in a simulation of face recognition by extracting a small number of feature points for both dogs and cats, at least eight feature points should be extracted in order to obtain a recognition rate of more than 75.32%. In particular, when the eight extracted feature points are the center point of the left eyeball, the center point of the right eyeball, the nose, the end point of the left ear, the end point of the right ear, the right contact point of the left ear and the forehead, the left contact point of the right ear and the forehead, and the top center end point of the forehead, as shown in FIG. 4, the simulation results show a face recognition rate of more than 93.21%.

According to one embodiment of the present disclosure, in order to secure a high identification accuracy in generating a dataset for training a face identification model based on an artificial neural network, normalization is performed on the training data as shown in Equation 1 below, and the identification accuracy is calculated when the training data and the normalized training data are used for training. Then, based on the identification accuracy, the optimal weight is calculated and applied to use a weighted average between the training data and the normalized training data by training through the dataset generated by the training data and the normalized training data.

$$P(\text{Decision}) = \alpha \times P(D_{raw}) + (1-\alpha) \times P(D_{normalized}) \quad \text{[Equation 1]}$$

$$\text{average} = \frac{TP}{FN + TP}$$

$$\text{balance} = \frac{1}{N}\sum_{i}^{N}\frac{TP_i}{FN_i + TP_i}$$

In Equation 1, P(Decision) may denote the identification accuracy of the identification model trained based on the generated dataset, $P(D_{raw})$ may denote the identification accuracy of the training data, $P(D_{normalized})$ may denote the identification accuracy of the normalized training data, and a may denote the weight index.

For all images included in the training data and the normalized training data, TP may denote the number of images determined as correct, FN may denote the number of images determined as incorrect, and FN+TP may denote the total number of images. For correction of accuracy, i may denote the selected class (breed or gender) and N may denote the total number of classes.

average may denote average accuracy, which may mean an average accuracy obtained based on the number of correctly predicted breeds and genders, and balance may denote corrected accuracy, which may mean an average accuracy between breeds, regardless of the number of images within each breed and gender.

According to one embodiment of the present disclosure, when the number of images evaluated for each class is the same, the average accuracy and the corrected accuracy should be the same. However, there is a difference between these accuracies due to the unbalanced number of images among the classes. To resolve this issue, the average accuracy and the corrected accuracy may be obtained based on the number of images determined as correct and the number of images determined as incorrect as a result of identifying the breed and gender, and the optimal weight index may be calculated such that the two accuracies are equalized. The calculated weight index may be applied to the training data and the normalized training data.

According to the above embodiments, the simulation results show that the weight index $\alpha$ has a high identification accuracy in the range of 0.38<$\alpha$<0.73, and that, on average, the weight index $\alpha$ tends to have a high identification accuracy as it approaches 0.5.

According to one embodiment of the present disclosure, a may be preset to 0.5, and may be updated by calculating an optimal weight index such that the average accuracy and corrected accuracy are uniform.

According to one embodiment of the present disclosure, the identified breed and gender information and the region of interest image data may be input to an artificial neural network-based face identification model to train the model to generate face identification data for identifying an individual, thereby increasing the identification accuracy.

According to one embodiment of the present disclosure, the artificial neural network-based face identification model may be formed as a convolutional neural network (CNN), which may perform convolutional operations with multiple convolutional operation layers, and may be structured as a first layer group and a second layer group by dividing some of the convolutional operation layers and the remaining part.

According to one embodiment of the present disclosure, information about the extracted feature points may be input to the first layer group of the artificial neural network-based face identification model to primarily derive breed identification information and gender identification information.

According to one embodiment of the present disclosure, information about eight feature points including the center point of the left eyeball, the center point of the right eyeball, the nose, the end point of the left ear, the end point of the right ear, the right contact point of the left ear and the forehead, the left contact point of the right ear and the forehead, and the top center end point of the forehead extracted from the image of the region of interest may be input to an input layer of the first layer group, and convolutional operations may be performed through multiple convolutional layers to derive breed identification information and gender identification information about the identified breed and gender.

According to one embodiment of the present disclosure, the output value of the first layer group and information about the extracted feature points are input to the input layer of the second layer group to generate object identification information, and a confidence score for the object identification information may be calculated based on the object identification information. The predictability of the face identification data may be calculated based on the confidence score of the object identification information, breed identification information, and gender identification information.

According to one embodiment of the present disclosure, the predictability of the face identification data may be calculated based on the confidence score of the object identification information, the breed identification information, and the gender identification information, as shown in Equation 2 below.

$$P(id|g, b; s) = \frac{\text{Score }(id) \times Ind_G(id; g) \times Ind_B(id; b)}{Z(g, b; s)} \quad \text{[Equation 2]}$$

$$Ind_G(id; g) = \begin{cases} 1 & \text{if identify matches the gender} \\ 0 & \text{otherwise} \end{cases}$$

$$Ind_B(id; b) = \begin{cases} 1 & \text{if identify matches the breed} \\ 0 & \text{otherwise} \end{cases}$$

Here, P(id|g, b; s) may denote the predictability of the face identification data, Score(id) may denote the confidence score of the object identification information, $Ind_G$(id; g) may denote the gender identification information, $Ind_B$(id;

b) may denote the breed identification information, and Z(g, b; s) may denote the normalization factor of each information.

The noise print recognition unit 300 may extract a rectangle-shaped region of interest included in a circle having a diameter of 10 to 15 cm that includes the boundaries of two nostrils of a companion animal from the face image, and perform contrast-limited adaptive histogram equalization and scale-invariant feature transform on the region of interest to extract the noise print according to the inner Gaussian difference to generate the noise print identification data.

According to one embodiment of the present disclosure, based on the noise print identification data, face determination information about whether a noise print data with a predetermined similarity or higher is present among the stored noise print data may be generated.

According to one embodiment of the present disclosure, in extracting a noise print from a region-of-interest image extracted from the face image, information loss may occur when the size of the region-of-interest image is excessively large or excessively small. Accordingly, resizing may be performed using Equation 3 below to perform image resizing while maintaining the width and height ratio of the original image.

$$S = \begin{cases} \dfrac{h}{w} & \text{if } w \le h \\ \dfrac{w}{h} & \text{otherwise} \end{cases}$$

$$[w', h'] = \begin{cases} [r, r \times s] & \text{if } w \le h \\ [r \times s, r] & \text{otherwise} \end{cases}$$

[Equation 3]

where S may denote a scale factor, w may denote a width, and h may denote a height, where w' may be a resized width and h' may be a resized height, r may be a reference value for resizing. According to one embodiment of the present disclosure, the reference value for resizing may be a size of 300×300 pixels or 300×400 pixels.

According to one embodiment of the present disclosure, contrast-limited adaptive histogram equalization may be performed on the resized region-of-interest image.

As used herein, histogram equalization refers to a representative image enhancement method that uses a cumulative distribution function of pixel values in an image. Conventional equalization increases the contrast of the entire image, resulting in many cases where the effect is not satisfactory.

According to one embodiment of the present disclosure, in order to overcome the limitations of the conventional equalization technique, equalization may be performed by applying the contrast-limited adaptive histogram equalization, which is a more advanced equalization technique.

Here, the contrast-limited adaptive histogram equalization refers to a technique that equalizes the histogram within each region by dividing the image into small regions and removing extreme noise using contrast limit. The contrast limit refers to a method of enhancing contrast more in darker areas and less in lighter areas.

In another embodiment of the present disclosure, the nose of a dog or cat, which makes up the majority of companion animals, is typically dark compared to the rest of the face, the image of the nose of a dog or cat, including the nose print, is often relatively low in contrast compared to the other images, and the same dog or cat may appear different in different images due to differences in lighting or illumination. Therefore, the contrast value can be adjusted by performing the contrast-limited adaptive histogram equalization to have a constant contrast level.

According to one embodiment of the present disclosure, the contrast-limited adaptive histogram equalization may be performed iteratively until the histogram is sufficiently stretched to reduce contrast differences between images and improve contrast. More specifically, it may be performed iteratively until more than 1000 pixels can be identified for a region-of-interest image.

According to one embodiment of the present disclosure, a feature extraction algorithm such as SIFT, SURF, BRISK, or ORB may be used to extract the feature points, and a keypoint detector and a descriptor may be used to find keypoints in the image, and a scriptor may generate information describing the keypoints.

According to one embodiment of the present disclosure, the noise print identification data may be generated by performing scale-invariant feature transform (SIFT) and extracting feature points based on the inner Gaussian difference.

According to the above embodiment, multiple image scale spaces may be generated by performing the SIFT, and feature points may be extracted by searching for a maximum edge as a keypoint in the space through a difference of Gaussian (DoG) detector as shown in Equation 4 below. Thereby, noise print identification data may be generated.

$$D(x,y,\sigma) = (G(x,y,k\sigma) - G(x,y,\sigma)) * I(x,y)$$

[Equation 4]

In Equation 4, D(x, y, σ) may denote the DoG, G may denote a Gaussian function, I may denote an image from which a feature point is to be extracted, and *I(x, y) may denote a convolution of the difference between the image and the Gaussian function value.

According to one embodiment of the present disclosure, the object identification unit 600 may generate object identification information by inputting the generated face determination information and the noise print determination information into an artificial neural network-based object identification model and applying a weight to each piece of the determination information.

According to one embodiment of the present disclosure, the object identification information may be generated by inputting the face determination information and the noise print determination information into the artificial neural network-based object identification model. Here, the object identification information may mean information that identifies whether the same individual is present among the registered companion animals, and may represent data generated by determining whether data with a predetermined similarity or higher are present among the face data and noise print data included in the database.

According to one embodiment of the present disclosure, in generating the object identification information based on the face determination information and the noise print determination information, the object identification information may be generated by calculating respective weights and applying the same to the face determination information and noise print determination information, thereby improving identification accuracy.

According to the above embodiment, by applying weights to the face determination information and nose print determination information input to the artificial neural network-based object identification model, the accuracy of the output value, the object identification information, may be analyzed, and the weight value with the highest accuracy may be calculated and applied.

FIG. 2 is a detailed block diagram of a companion animal identification system 11 implemented according to a second embodiment of the present disclosure.

Referring to FIG. 2, the companion animal identification system 11 implemented according to the second embodiment of the present disclosure may further include a voice recognition part 400 in addition to the components of the companion animal identification system 10 implemented according to the first embodiment of the present disclosure.

The voice recognition part 400 may segment the acquired voice data of the companion animal into multiple frames according to a preset reference value, extract feature vectors from the segmented frames to perform histogram modeling, and acquire a code according to the histogram modeling.

According to one embodiment of the present disclosure, based on the voice identification data generated by the acquired code, voice determination information about whether a code of voice data having a predetermined similarity or higher is present among the codes of voice data stored in the database may be generated.

According to one embodiment of the present disclosure, multiple frames may be generated by segmenting the acquired voice data of a companion animal by a certain length according to a preset reference value, and histogram modeling may be performed to extract a feature vector from each of the frames to create a histogram model, and a code may be generated according to the shape of the histogram model formed through histogram modeling.

Here, the histogram modeling means that the envelope constituted by the histogram of the defect signal information by normalizing the sound emission signal to 256 steps is modeled as a feature, and the features of the modeled envelope are extracted from the modeled defect signal using partial autocorrelation coefficients (PARCOR), and the features representing the unique characteristics of the defect signal are selected by the distance evaluation technique (DET) to generate an identifiable code.

According to one embodiment of the present disclosure, voice identification data may be generated to include the generated code, and voice determination information may be generated by determining whether a code of voice data having a predetermined similarity or higher is present among the codes of voice data stored in the database.

According to an embodiment of the present disclosure, the object identification unit 600 may generate object identification information by inputting the generated face determination information, nose print determination information, and voice determination information into an artificial neural network-based object identification model and applying a weight to corresponding determination information.

According to one embodiment of the present disclosure, the object identification information may be generated by inputting the face determination information, nose print determination information, and voice determination information into the artificial neural network-based object identification model. In generating the object identification information based on the face determination information, nose print determination information, and voice determination information, the object identification information may be generated by calculating and applying a weight to each of the face determination information and nose print determination information, thereby improving the identification accuracy.

FIG. 3 is a detailed block diagram of a companion animal identification system implemented according to a third embodiment of the present disclosure.

Referring to FIG. 3, the companion animal identification system 12 implemented according to the third embodiment of the present disclosure may further include a motion recognition unit 500 in addition to the companion animal identification system 11 implemented according to the second embodiment.

The motion recognition unit 500 may segment the acquired video data into multiple consecutive frames based on a preset reference, analyze the multiple frames to generate motion identification data for a structured pattern present in the motion of the companion animal, and generate motion determination information about whether motion data including pattern information having a predetermined similarity or higher is present among the motion data stored in the database based on the face identification data.

According to one embodiment of the present disclosure, the object identification unit 600 may generate object identification information by calculating and applying respective weights to the face determination information, nose print determination information, voice determination information, and motion determination information in generating object identification information based on the face determination information and the nose print determination information, thereby improving identification accuracy.

According to the above embodiment, the accuracy of the output value obtained by applying weights to the face determination information, nose print determination information, voice determination information, and motion determination information in the artificial neural network-based object identification model, the object identification information may be analyzed, and the weight value with the highest accuracy may be calculated and applied.

According to one embodiment of the present disclosure, in generating motion identification data, the multiple frames may be analyzed to identify a motion of a companion animal, and the motion dynamics of the motion over a period of time may be analyzed and the repeated motion dynamics of the motion may be stored as a structured pattern, and motion identification data including information about the stored structured pattern may be generated.

According to one embodiment of the present disclosure, based on the generated motion identification data, motion determination information including determination information about whether motion data including pattern information of a predetermined similarity or higher is present among the motion data stored in a database may be generated.

FIG. 4 illustrates eight feature points extracted for face recognition of a companion animal according to one embodiment of the present disclosure.

Referring to FIG. 4, which shows eight feature points extracted for face recognition of a companion animal according to one embodiment of the present disclosure, a face image may be captured by searching for the face of the companion animal, and eight feature points may be extracted from the center point of the left eyeball, the center point of the right eyeball, the nose, the end point of the left ear, the end point of the right ear, the right contact point of the left ear and the forehead, the left contact point of the right ear and the forehead, and the top center point of the forehead in the captured face image.

FIG. 5 is a diagram illustrating a process for calculating the predictability of face identification data using a confidence score of object identification information, breed identification information, and gender identification information according to one embodiment of the present disclosure.

Referring to FIG. 5, according to one embodiment of the present disclosure, the face recognition unit 200 may calculate the predictability of the face identification data based on the confidence score of the object identification information, the breed identification information, and the gender identification information. For example, it may calculate the predictability of the face identification data as shown in Equation 2 by reflecting the probability of a correct or incorrect answer when the identified breed is a pug, the probability of a correct or incorrect answer when the identified gender is a male, and the confidence score given when the identified object is a companion animal "Bella."

FIG. 6 is a diagram illustrating a process for extracting a region of interest from a nose image, according to one embodiment of the present disclosure.

Referring to FIG. 6, which illustrates extracting a region of interest from a nose image according to one embodiment of the present disclosure, a region of interest in the shape of a rectangle included in a circle with a diameter of 10 to 15 cm that includes the boundaries of two nostrils of a companion animal may be extracted from the face image.

FIG. 7 shows a contrast between an original image and images that have undergone contrast-limited adaptive histogram equalization of a region of interest according to one embodiment of the present disclosure.

FIG. 7 shows an original image and an image obtained by performing contrast-limited adaptive histogram equalization on the region of interest according to one embodiment of the present disclosure. In a) of FIG. 7, the original image is obtained without performing equalization on the region of interest and is very dark and insufficiently bright to identify pixels.

Therefore, when contrast-limited adaptive histogram equalization is performed on such an original image, the contrast becomes relatively brighter, increasing the number of identified pixels, as shown in b) of FIG. 7. Repeating the contrast-limited adaptive histogram equalization until more than 1000 pixels can be identified may facilitate the extraction of feature points with brighter contrast, as shown in c) of FIG. 7.

FIG. 8 illustrates extracting a feature vector from a frame of segmented speech data and performing histogram modeling to acquire a code according to one embodiment of the present disclosure.

Referring to FIG. 8, it is illustrated that a code is obtained by extracting a feature vector and performing histogram modeling on a frame of segmented speech data according to one embodiment of the present disclosure, wherein a feature of a modeled envelope is extracted from a modeled fault signal using a partial correlation coefficient, and a feature representing a characteristic unique to the fault signal is selected by DET to generate an identifiable code.

FIG. 9 is a diagram illustrating generating object identification information by applying a weight to determination information according to one embodiment of the present disclosure.

Referring to FIG. 9, which illustrates generating object identification information by applying a weight to determination information according to one embodiment of the present disclosure, The object identification information may be generated by calculating and applying each weight to the face determination information, the noise print determination information, the voice determination information, and the motion determination information. The accuracy of the output value obtained by applying weights to the face determination information (0.90), noise print determination information (0.95), voice determination information (1.00), and motion determination information (0.98), respectively may be analyzed, and object identification information, and the weight value with the highest accuracy may be calculated and applied.

FIG. 10 is a flowchart illustrating a companion animal identification method according to one embodiment of the present disclosure.

At least one of the face data, nose print data, voice data, and motion data about each companion animal is stored (S10).

According to one embodiment of the present disclosure, at least one of face data, nose print data, voice data, and motion data may be stored for each of multiple registered companion animals.

According to one embodiment of the present disclosure, at least one of face data including face identification information, nose print data including nose print identification information, voice data including voice identification information, and motion data including motion identification information may be stored for each individual of the registered companion animals.

A breed is identified by extracting multiple feature points from a face image of the companion animal, face identification data is generated by performing feature point analysis, and face determination information about whether face data having a predetermined similarity or higher is present is generated (S20).

According to one embodiment of the present disclosure, the face of an companion animal may be searched for in the acquired image information to capture a face image, and multiple feature points may be extracted from the captured face image to generate face identification data for face identification in consideration of a breed or gender using a face identification model based on an artificial neural network. Then, face determination information related to whether face data having a predetermined similarity or higher is present among the face data stored in the database may be generated based on the face identification data.

According to one embodiment of the present disclosure, as a preprocessing step for extracting feature points and performing feature point analysis using an artificial neural network-based face identification model, a face image may be generated by first searching for the face of a companion animal and capturing the found image identified as a face.

According to one embodiment of the present disclosure, multiple feature points may be extracted from the captured face image. In order to minimize the consumption of computing resources and reduce the extraction time in extracting the features, the number of features to be extracted may be limited to a small number.

According to one embodiment of the present disclosure, when the number of features to be extracted is limited to a small number, the recognition accuracy must be maintained at or above a certain level while extracting a small number of features. Therefore, it is necessary to select features at advantageous positions to identify the face shape of the animal. Depending on the positions of the features, the amount of computing resources required to recognize the face, the recognition speed, and the recognition accuracy may vary greatly.

According to one embodiment of the present disclosure, a multi-object recognition technique may be used to extract the feature points. Among such techniques, the Oriented FAST and Rotated BRIEF (ORB) algorithm may be employed.

According to the above embodiment, a window region may be taken and the brightness value of the center point may be compared with 16 brightness values. For example, the brightness values located at 1, 5, 9, and 13 may first be compared and assigned a value of 1 when dark or bright and 0 when similar, and points with a value greater than 3 may be selected as candidate feature points.

Then, the remaining brightness values are compared to determine a point as a feature point when the value is greater than or equal to 12, and a pixel with the greatest value among 8 neighbor pixels around each feature point is determined as the final feature point. To remove blob feature points from the feature points and extract corner feature points, Haris Corner Detection can be utilized.

In this case, since Haris Corner Detection can recognize the corner area, only the corner can be extracted, and furthermore, the direction can be determined using the Intensity Centroid to obtain the main direction.

According to the above embodiment, creating a partial image around each feature point, rotating all comparison points using the main direction, and constructing a bit string description is less informative and differentiating.

To address this issue, p(x) and p(y) are not arbitrarily determined, but two pixel selection patterns with good informativeness and discrimination may be determined and made into training data, and 256 binary tests may be obtained based on the training data to generate descriptors.

According to one embodiment of the present disclosure, eight feature points are extracted from the captured face image. The eight extracted points may include a center point of the left eyeball, a center point of the right eyeball, a nose, an end point of the left ear, an end point of the right ear, a right contact point of the left ear and the forehead, a left contact point of the right ear and the forehead, and a top center end point of the forehead.

According to the above embodiment, the identification accuracy may be increased by performing normalization based on multiple training data from which the eight feature points are extracted, and training a face identification model based on an artificial neural network to identify a breed and gender by inputting the feature point information based on a dataset generated by applying weights to the training data and the normalized training data, and to generate face identification data capable of identifying an object by inputting the identified breed and gender information and image data of a region of interest.

According to one embodiment of the present disclosure, as a result of identifying the breed and gender through the artificial neural network-based face identification model, the optimal weights for the training data and the normalized training data may be calculated based on the average accuracy and the corrected accuracy obtained based on the number of images determined as correct and the number of images determined as incorrect.

According to one embodiment of the present disclosure, in a simulation of face recognition by extracting a small number of feature points for both dogs and cats, at least eight feature points should be extracted in order to obtain a recognition rate of more than 75.32%. In particular, when the eight extracted feature points are the center point of the left eyeball, the center point of the right eyeball, the nose, the end point of the left ear, the end point of the right ear, the right contact point of the left ear and the forehead, the left contact point of the right ear and the forehead, and the top center end point of the forehead, as shown in FIG. 4, the simulation results show a face recognition rate of more than 93.21%.

According to one embodiment of the present disclosure, in order to secure a high identification accuracy in generating a dataset for training a face identification model based on an artificial neural network, normalization is performed on the training data as shown in Equation 1, and the identification accuracy is calculated when the training data and the normalized training data are used for training. Then, based on the identification accuracy, the optimal weight is calculated and applied to use a weighted average between the training data and the normalized training data by training through the dataset generated by the training data and the normalized training data.

According to one embodiment of the present disclosure, for all images included in the training data and the normalized training data, TP may denote the number of images determined as correct, FN may denote the number of images determined as incorrect, and FN+TP may denote the total number of images. For correction of accuracy, i may denote the selected class (breed or gender) and N may denote the total number of classes.

According to one embodiment of the present disclosure, average may denote average accuracy, which may mean an average accuracy obtained based on the number of correctly predicted breeds and genders, and balance may denote corrected accuracy, which may mean an average accuracy between breeds, regardless of the number of images within each breed and gender.

According to one embodiment of the present disclosure, when the number of images evaluated for each class is the same, the average accuracy and the corrected accuracy should be the same. However, there is a little difference between these accuracies due to the unbalanced number of images among the classes. To resolve this issue, the average accuracy and the corrected accuracy may be obtained based on the number of images determined as correct and the number of images determined as incorrect as a result of identifying the breed and gender, and the optimal weight index may be calculated such that the two accuracies are equalized. The calculated weight index may be applied to the training data and the normalized training data.

According to the above embodiments, the simulation results show that the weight index $\alpha$ has a high identification accuracy in the range of $0.38<\alpha<0.73$, and that, on average, the weight index $\alpha$ tends to have a high identification accuracy as it approaches 0.5.

According to one embodiment of the present disclosure, the identified breed and gender information and the region of interest image data may be input to an artificial neural network-based face identification model to train the model to generate face identification data for identifying an individual, thereby increasing the identification accuracy.

According to one embodiment of the present disclosure, the artificial neural network-based face identification model may be formed as a convolutional neural network (CNN), which may perform convolutional operations with multiple convolutional operation layers, and may be structured as a first layer group and a second layer group by dividing some of the convolutional operation layers and the remaining part.

According to one embodiment of the present disclosure, information about the extracted feature points may be input to the first layer group of the artificial neural network-based face identification model to primarily derive breed identification information and gender identification information.

According to one embodiment of the present disclosure, information about eight feature points including the center point of the left eyeball, the center point of the right eyeball, the nose, the end point of the left ear, the end point of the right ear, the right contact point of the left ear and the forehead, the left contact point of the right ear and the forehead, and the top center end point of the forehead extracted from the image of the region of interest may be input to an input layer of the first layer group, and convolutional operations may be performed through multiple convolutional layers to derive breed identification information and gender identification information about the identified breed and gender.

According to one embodiment of the present disclosure, the output value of the first layer group and information about the extracted feature points are input to the input layer of the second layer group to generate object identification information, and a confidence score for the object identification information may be calculated based on the object identification information. The predictability of the face identification data may be calculated based on the confidence score of the object identification information, breed identification information, and gender identification information.

According to one embodiment of the present disclosure, the predictability of the face identification data may be calculated based on the confidence score of the object identification information, the breed identification information, and the gender identification information, as shown in Equation 2.

Nose print identification data is generated by extracting a nose print according to an inner Gaussian difference by performing contrast-limited adaptive histogram correction and scale-invariant feature transform on a rectangle-shaped region of interest extracted from a face image, and nose print determination information about whether nose print data with a predetermined similarity or higher is present is generated (S30).

According to one embodiment of the present disclosure, a region of interest in the shape of a rectangle included in a circle with a diameter of 10 to 15 cm that includes the boundaries of two nostrils of a companion animal may be extracted from a face image, and contrast-limited adaptive histogram equalization and scale-invariant feature transform may be performed on the region of interest to extract the noise print according to the inner Gaussian difference to generate the noise print identification data.

According to one embodiment of the present disclosure, based on the noise print identification data, face determination information about whether a noise print data with a predetermined similarity or higher is present among the stored noise print data may be generated.

According to one embodiment of the present disclosure, in extracting a noise print from a region-of-interest image extracted from the face image, information loss may occur when the size of the region-of-interest image is excessively large or excessively small. Accordingly, resizing may be performed using Equation 3 to perform image resizing while maintaining the width and height ratio of the original image.

According to one embodiment of the present disclosure, contrast-limited adaptive histogram equalization may be performed on the resized region-of-interest image.

As used herein, histogram equalization refers to a representative image enhancement method that uses a cumulative distribution function of pixel values in an image. Conventional equalization increases the contrast of the entire image, resulting in many cases where the effect is not satisfactory.

According to one embodiment of the present disclosure, in order to overcome the limitations of the conventional equalization technique, equalization may be performed by applying the contrast-limited adaptive histogram equalization, which is a more advanced equalization technique.

Here, the contrast-limited adaptive histogram equalization refers to a technique that equalizes the histogram within each region by dividing the image into small regions and removing extreme noise using contrast limit. The contrast limit refers to a method of enhancing contrast more in darker areas and less in lighter areas.

In another embodiment of the present disclosure, the nose of a dog or cat, which makes up the majority of companion animals, is typically dark compared to the rest of the face, the image of the nose of a dog or cat, including the nose print, is often relatively low in contrast compared to the other images, and the same dog or cat may appear different in different images due to differences in lighting or illumination. Therefore, the contrast value can be adjusted by performing the contrast-limited adaptive histogram equalization to have a constant contrast level.

According to one embodiment of the present disclosure, the contrast-limited adaptive histogram equalization may be performed iteratively until the histogram is sufficiently stretched to reduce contrast differences between images and improve contrast. More specifically, it may be performed iteratively until more than 1000 pixels can be identified for a region-of-interest image.

According to one embodiment of the present disclosure, a feature extraction algorithm such as SIFT, SURF, BRISK, or ORB may be used to extract the feature points, and a keypoint detector and a descriptor may be used to find keypoints in the image, and a scriptor may generate information describing the keypoints.

According to one embodiment of the present disclosure, the noise print identification data may be generated by performing scale-invariant feature transform (SIFT) and extracting feature points based on the inner Gaussian difference.

According to the above embodiment, multiple image scale spaces may be generated by performing the SIFT, and feature points may be extracted by searching for a maximum edge as a keypoint in the space through a difference of Gaussian (DoG) detector as shown in Equation 4. Thereby, noise print identification data may be generated.

A feature vector is extracted by segmenting voice data of a companion animal into multiple frames, a code according to the histogram modeling is acquired by performing histogram modeling, and voice determination information about whether a code of voice data having a predetermined similarity or higher is present is generated based on the voice identification data generated by the code (S40).

According to one embodiment of the present disclosure, the acquired voice data of the companion animal may be segmented into multiple frames according to a preset reference value, and feature vectors may be extracted from the segmented frames to perform histogram modelling. A code may be acquired according to the histogram modeling.

According to one embodiment of the present disclosure, based on the voice identification data generated by the acquired code, voice determination information about whether a code of voice data having a predetermined similarity or higher is present among the codes of voice data stored in the database may be generated.

According to one embodiment of the present disclosure, multiple frames may be generated by segmenting the acquired voice data of a companion animal by a certain length according to a preset reference value, and histogram modeling may be performed to extract a feature vector from each of the frames to create a histogram model, and a code may be generated according to the shape of the histogram model formed through histogram modeling.

Here, the histogram modeling means that the envelope constituted by the histogram of the defect signal information by normalizing the sound emission signal to 256 steps is modeled as a feature, and the features of the modeled envelope are extracted from the modeled defect signal using partial autocorrelation coefficients (PARCOR), and the features representing the unique characteristics of the defect signal are selected by the distance evaluation technique (DET) to generate an identifiable code.

According to one embodiment of the present disclosure, voice identification data may be generated to include the generated code, and voice determination information may be generated by determining whether a code of voice data having a predetermined similarity or higher is present among the codes of voice data stored in the database.

The video data is segmented into multiple frames, motion identification data is generated for a structured pattern present in the motion of the companion animal by analyzing the multiple frames, and motion determination information about whether motion data including pattern information having a predetermined similarity or higher is present is generated based on the face identification data (S50).

According to one embodiment of the present disclosure, the acquired video data is divided into multiple consecutive frames based on a preset criterion, the plurality of frames are analyzed to generate motion identification data for a structured pattern present in the movement of the companion animal, and motion determination information is generated as to whether motion data containing pattern information of a predetermined similarity or higher exists among the motion data stored in the database based on the face identification data.

According to one embodiment of the present disclosure, the acquired video data may be segmented into multiple consecutive frames based on a preset reference, and motion identification data for a structured pattern present in the motion of the companion animal may be generated by analyzing the multiple frames. Also, motion determination information about whether motion data including pattern information having a predetermined similarity or higher is present among the motion data stored in the database may be generated based on the face identification data.

According to one embodiment of the present disclosure, based on the generated motion identification data, motion determination information including determination information about whether motion data including pattern information of a predetermined similarity or higher is present among the motion data stored in a database may be generated.

Object identification information is generated by inputting face determination information, nose print determination information, voice determination information, and motion determination information into an artificial neural network-based object identification model and applying a weight to corresponding determination information (S60).

According to one embodiment of the present disclosure, in generating the object identification information based on the face determination information, nose print determination information, voice determination information, and motion determination information, the object identification information may be generated by calculating and applying a weight to each of the face determination information and nose print determination information, thereby improving the identification accuracy.

The embodiments of the present disclosure are not only implemented through the apparatus and/or methods described above. Although the embodiments of the present disclosure have been described in detail above, the scope of the present disclosure is not limited thereto. Various modifications and variations by those skilled in the art using the basic concepts of this disclosure, as defined in the appended claims, are also within the scope of the present disclosure.

The invention claimed is:

1. A system for identifying a companion animal, comprising:
    a database storing at least one of face data, noise print data, voice data, or motion data for each of a plurality of registered companion animals;
    a face recognition unit configured to capture a face image by searching for a face of the companion animal in acquired image information, to extract a plurality of feature points from the captured face image to generate face identification data enabling face identification in consideration of a breed or gender using an artificial neural network-based face identification model, and to generate face determination information about whether face data having a predetermined similarity or higher exists among the face data stored in the database based on the face identification data;
    a noise print recognition unit configured to extract a rectangle-shaped region of interest included in a circle having a diameter of 10 to 15 cm that includes boundaries of two nostrils of the companion animal from the face image, and to perform contrast-limited adaptive histogram equalization and scale-invariant feature transform on the region of interest to extract feature points according to an inner Gaussian difference to generate noise print identification data, and to generate noise print determination information about whether noise print data having a predetermined similarity or higher is present among the noise print data stored in the database based on the noise print identification data; and
    an object identification unit configured to generate object identification information by inputting the generated face determination information and the noise print determination information into the artificial neural network-based object identification model and applying a weight to each of the determination informations.

2. The system of claim 1, further comprising:
    a voice recognition unit configured to segment the acquired voice data of the companion animal into a plurality of frames according to a preset reference value, extract a feature vector for the segmented frames to perform histogram modeling to acquire a code according to the histogram modeling, and generate voice determination information about whether a code of voice data having a predetermined similarity or higher is present among the codes of the voice data stored in the database based on the generated voice identification data including the code according to the histogram modeling; and
    an object identification unit configured to generate object identification information by inputting the generated face determination information, noise print determination information, and voice determination information into an artificial neural network-based object identification model and applying a weight to each of the determination informations.

3. The system of claim 1, further comprising:
    a motion recognition unit configured to segment acquired video data into a plurality of consecutive frames according to a preset reference, analyze the plurality of frames to generate motion identification data for a structured pattern present in a motion of the companion animal, and generate motion determination information about whether motion data including pattern information having a predetermined similarity or higher is present among the motion data stored in the database based on the face identification data; and an object identification unit configured to generate object identification information by inputting the generated face determination information, noise print determination information, and motion determination information into an artificial neural network-based object identification model and applying a weight to each of the determination informations.

4. The system of claim 1, wherein the face recognition unit is configured to:

extract eight feature points from the captured face image, wherein the eight extracted points comprise a center point of a left eyeball, a center point of a right eyeball, a nose, an end point of a left ear, an end point of a right ear, a right contact point of the left ear and a forehead, a left contact point of the right ear and the forehead, and a top center end point of the forehead;

perform normalization based on a plurality of training data from which the eight feature points are extracted, and an artificial neural network-based face identification model to identify a breed and gender upon inputting of feature point information based on a dataset generated by applying weights to the training data and the normalized training data, and to generate face identification data for identifying an object by inputting the identified breed and gender and image data of the region of interest to increase identification accuracy; and calculate an optimal weight for the training data and the normalized training data based on an average accuracy and a corrected accuracy obtained based on the number of images determined as correct and the number of images determined as incorrect as a result of identifying the breed and gender through the artificial neural network-based face identification model.

5. The system of claim 4, wherein the face recognition unit is configured to:

perform convolutional operations with a plurality of convolutional operation layers by forming the artificial neural network-based face identification model as a convolutional neural network (CNN);

divide a portion of the plurality of convolutional operation layers from the remaining portion of the plurality of convolutional operation layers to form a first layer group and a second layer group;

input information about the eight feature points extracted from the image of the region of interest into an input layer of the first layer group, and derive breed identification information and gender identification information for the identified breed and gender by performing convolutional operations using a plurality of convolutional layers; and generate object identification information by inputting an output value of the first layer group and information about the extracted feature points into an input layer of the second layer group, calculate a confidence score for the object identification information based on the object identification information, and calculate a predictability of the face identification data based on the confidence score of the object identification information, the breed identification information, and the gender identification information.

* * * * *